United States Patent

Yoshikawa et al.

(10) Patent No.: US 10,265,680 B2
(45) Date of Patent: Apr. 23, 2019

(54) SILICA PARTICLE COMPRISING A TITANIA COATING AND METHOD FOR PRODUCING THE SAME

(71) Applicant: FUJI XEROX CO., LTD., Tokyo (JP)

(72) Inventors: Hideaki Yoshikawa, Kanagawa (JP);
Hidekazu Hirose, Kanagawa (JP);
Hiroyoshi Okuno, Kanagawa (JP);
Takeshi Iwanaga, Kanagawa (JP);
Yasunobu Kashima, Kanagawa (JP);
Wataru Yamada, Kanagawa (JP);
Sakae Takeuchi, Kanagawa (JP);
Atsushi Sugitate, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 30 days.

(21) Appl. No.: 15/223,447

(22) Filed: Jul. 29, 2016

(65) Prior Publication Data

US 2017/0252724 A1 Sep. 7, 2017

(30) Foreign Application Priority Data

Mar. 4, 2016 (JP) ................. 2016-042630

(51) Int. Cl.
| | | |
|---|---|---|
| *B32B 5/16* | (2006.01) | |
| *B01J 21/08* | (2006.01) | |
| *B01J 35/00* | (2006.01) | |
| *B01J 21/06* | (2006.01) | |
| *B01J 37/02* | (2006.01) | |
| *B01J 37/00* | (2006.01) | |
| *B01J 37/08* | (2006.01) | |

(52) U.S. Cl.
CPC ............. *B01J 21/08* (2013.01); *B01J 21/063* (2013.01); *B01J 35/002* (2013.01); *B01J 35/004* (2013.01); *B01J 35/008* (2013.01); *B01J 37/0045* (2013.01); *B01J 37/0072* (2013.01); *B01J 37/0209* (2013.01); *B01J 37/0221* (2013.01); *B01J 37/08* (2013.01); *C01P 2006/60* (2013.01); *Y10T 428/2993* (2015.01)

(58) Field of Classification Search
CPC ...... B01J 21/08; B01J 21/063; C01P 2006/60; Y10T 428/2991; Y10T 428/2993
USPC .................................................. 428/403–406
See application file for complete search history.

(56) References Cited

U.S. PATENT DOCUMENTS 6,632,771 B1 * 10/2003 Maekawa .......... B01D 53/8628
502/239
2006/0009351 A1 1/2006 Iwamoto et al.

FOREIGN PATENT DOCUMENTS

| JP | H08-196903 A | 8/1996 |
|---|---|---|
| JP | H11-138017 A | 5/1999 |
| JP | 2004-155648 A | 6/2004 |
| JP | 2006-021112 A | 1/2006 |
| JP | 2008-212841 A | 9/2008 |
| JP | 2011-005389 A | 1/2011 |
| JP | 5077236 B2 | 11/2012 |
| JP | 2014-128768 A | 7/2014 |
| WO | 2008/038529 A1 | 4/2008 |

\* cited by examiner

*Primary Examiner* — Hoa (Holly) Le
(74) *Attorney, Agent, or Firm* — Oliff PLC

(57) ABSTRACT

A silica particle includes a silica particle body and a titania coating layer formed on a surface of the silica particle body through a reaction of a titanium compound having a structure in which a hydrocarbon group bonds to a titanium atom through an oxygen atom. The silica particle has absorption at a wavelength of about 400 nm or more and about 800 nm or less in an ultraviolet-visible absorption spectrum.

19 Claims, No Drawings

SILICA PARTICLE COMPRISING A TITANIA COATING AND METHOD FOR PRODUCING THE SAME

CROSS-REFERENCE TO RELATED APPLICATIONS

This application is based on and claims priority under 35 USC 119 from Japanese Patent Application No. 2016-042630 filed Mar. 4, 2016.

BACKGROUND

Technical Field

The present invention relates to a silica particle and a method for producing the silica particle.

SUMMARY

According to an aspect of the invention, there is provided a silica particle including a silica particle body and a titania coating layer formed on a surface of the silica particle body through a reaction of a titanium compound having a structure in which a hydrocarbon group bonds to a titanium atom through an oxygen atom, wherein the silica particle has absorption at a wavelength of about 400 nm or more and about 800 nm or less in an ultraviolet-visible absorption spectrum.

DETAILED DESCRIPTION

Hereafter, exemplary embodiments of the present invention will be described.
Silica Particles Silica particles according to this exemplary embodiment include a titania coating layer formed on each of surfaces of silica particle bodies through a reaction of a titanium compound having a structure in which a hydrocarbon group bonds to a titanium atom through an oxygen atom.

The silica particles have absorption at a wavelength of 400 nm or about 400 nm or more and 800 nm or about 800 nm or less in an ultraviolet-visible absorption spectrum.

Therefore, the silica particles according to this exemplary embodiment exhibit a photocatalytic function in the visible range. The reason for this is believed to be as follows.

Titanium oxide particles serving as a photocatalyst normally exhibit a photocatalytic function (photocatalysis) through absorption of ultraviolet light. Therefore, titanium oxide particles are capable of exhibiting a photocatalytic function during daytime on a sunny day in which a sufficient dose is provided. However, titanium oxide particles hardly exhibit a sufficient photocatalytic function at night or in the shade. For example, when titanium oxide particles are used for a material for exterior walls, there is a difference in antifouling properties between the sunny place and the shade in many cases. Furthermore, when titanium oxide particles are used in an air cleaner, a water purifier, or the like, some space is required inside an apparatus (e.g., installation of a black light serving as a light source for ultraviolet rays), which tends to increase the cost more than necessary.

Titanium oxide particles that exhibit a photocatalytic function (photocatalysis) through absorption of visible light have been known in recent years. Examples of such visible light-absorbing titanium oxide particles include titanium oxide particles obtained by carrying dissimilar metals (e.g., iron, copper, and tungsten) onto titanium oxide and titanium oxide particles doped with nitrogen, sulfur, or the like.

For silica particles including a titania coating layer on each of surfaces of silica particle bodies, there has also been a demand for silica particles that exhibit a photocatalytic function in the visible range. This indicates that there have been increasing needs for diversification of photocatalyst materials in the visible range. When silica particle bodies are used as base particles, the diversification is addressed in terms of particle size control, ease of shape control, increase in surface area with use of abundant pores, reduction in the amount of raw material used due to low specific gravity, and improvement in thermal resistance of crystal structure through formation of a composite.

To achieve this, there are provided silica particles that include a titania coating layer formed on each of surfaces of silica particle bodies through a reaction of a titanium compound having a structure in which a hydrocarbon group bonds to a titanium atom through an oxygen atom and that have absorption at a wavelength of 400 nm or about 400 nm or more and 800 nm or about 800 nm or less in an ultraviolet-visible absorption spectrum.

In these silica particles, it is believed that carbon obtained as a result of carbonization of the hydrocarbon is present on, that is, is incorporated into the surfaces of silica particle bodies and the titania coating layer.

The incorporated carbon is believed to function as a charge separation substance, and a photocatalytic function is exhibited. The carbon also exhibits a photocharge separation function through absorption of visible light together with ultraviolet light, and a photocatalytic function is exhibited. This shows that silica particles have absorption at a wavelength of 400 nm or about 400 nm or more and 800 nm or about 800 nm or less in an ultraviolet-visible absorption spectrum. Furthermore, the carbon serving as a charge separation substance also has a function of facilitating the separation of charges generated as a result of light absorption and thus functions as a promoter.

In other words, the carbon present on the surfaces of the silica particle bodies and the titania coating layer has a function of selectively trapping electrons through absorption of visible light together with ultraviolet light. Thus, the carbon serving as a charge separation substance decreases probability that electrons and holes generated through light absorption are recombined with each other. This efficiently facilitates the separation of charges, which exhibits the photocatalytic function.

Accordingly, the silica particles having the above features according to this exemplary embodiment are believed to exhibit a photocatalytic function in the visible range.

The silica particles according to this exemplary embodiment include a titania coating layer on the surfaces thereof, and thus have good dispersibility. Therefore, such silica particles form a substantially uniform film and light is efficiently incident on the silica particles, and thus the photocatalytic function is easily exhibited. Furthermore, the transparency of films and the like and the uniformity of coating films of coating liquids are improved, and the design is maintained. Consequently, for example, when a paint containing the silica particles is applied onto surfaces of materials for exterior walls, boards, pipes, and nonwoven fabrics (nonwoven fabrics made of a ceramic or the like), the aggregation of silica particles and the coating defects are suppressed. Thus, the photocatalytic function is easily exhibited for a long time.

Hereafter, silica particles according to this exemplary embodiment will be described in detail.

Silica Particle Bodies

The silica particle bodies (silica particles on which a titania coating layer is to be formed) may be particles of silica, that is, particles mainly made of $SiO_2$ and may be crystalline or amorphous. The silica particle bodies may be particles produced using, as a raw material, a silicon compound such as water glass or alkoxysilane or may be particles produced by crushing quartz. The silica particle bodies may be, for example, non-porous particles, porous particles, or hollow particles.

Specific examples of the silica particle bodies include sol-gel silica particles, aqueous colloidal silica particles, alcohol-based silica particles, fumed silica particles obtained by a gas-phase method, and fused silica particles.

Among them, sol-gel silica particles may be used as the silica particle bodies. The sol-gel silica particles are produced by, for example, subjecting a polyfunctional silane compound to hydrolysis and condensation in a mixed solution containing the polyfunctional silane compound, alcohol, and water in the presence of an alkaline catalyst.

Examples of the polyfunctional silane compound include tetramethoxysilane, tetraethoxysilane, tetraisopropoxysilane, and tetrabutoxysilane. Tetramethoxysilane and tetraethoxysilane may be used in terms of, for example, the shape, particle size, and particle size distribution of silica particles. Examples of the alkaline catalyst include basic catalysts such as ammonia, urea, monoamine, and quaternary ammonium salts. In particular, ammonia is used. Examples of the alcohol include methanol and ethanol.

The silica particle bodies may be silica particles surface-treated with a well-known hydrophobizing agent (e.g., silane coupling agent).

Titania Coating Layer

The titania coating layer is a coating layer formed on each of the surfaces of the silica particle bodies through a reaction of a titanium compound having a structure in which a hydrocarbon group bonds to a titanium atom through an oxygen atom. Specifically, for example, the titania coating layer is formed on each of the surfaces of the silica particle bodies through a reaction of hydrocarbon groups (e.g., alkoxy groups) that bond to oxygen atoms in a titanium compound and a reaction of the hydrocarbon group with a silanol group on the surfaces of the silica particle bodies.

The titanium compound is a metal compound having a structure in which a hydrocarbon group bonds to a titanium atom through an oxygen atom. Examples of compounds for the titanium compound include alkoxide compounds (e.g., methoxide, ethoxide, n-propoxide, i-propoxide, n-butoxide, i-butoxide, sec-butoxide, and tert-butoxide); and chelate compounds and acylate compounds (e.g., β-diketones such as acetylacetonate; β-ketoesters such as ethyl acetoacetate; amines such as triethanolamine; and carboxylic acids such as acetic acid, butyric acid, lactic acid, and citric acid).

The titanium compound may be a titanium compound having at least one alkoxy group (preferably two or more alkoxy groups) in terms of, for example, the control of rate of reaction and the shape, particle size, and particle size distribution of silica particles to be obtained. In other words, the titanium compound may be a titanium compound in which at least one (preferably two or more) alkoxy group (an alkyl group that bonds to a titanium atom through an oxygen atom) bonds to a titanium atom.

The number of carbon atoms of the alkoxy group is 8 or less and preferably 3 or more and 8 or less in terms of, for example, the control of rate of reaction and the shape, particle size, and particle size distribution of silica particles to be obtained.

More specifically, the titanium compound may be a compound represented by general formula $M^1Y^1_4$ ($M^1$ represents a titanium atom; $Y^1$ represents a halogen atom, a hydroxy group, or an alkoxy group; and four $Y^1$ may represent the same group or different groups, where at least one of four $Y^1$ represents an alkoxy group).

In the general formula $M^1Y^1_4$, the halogen atom represented by $Y^1$ is, for example, fluorine, chlorine, bromine, or iodine. Among them, the halogen atom is preferably chlorine, bromine, or iodine.

The alkoxy group represented by $Y^1$ is, for example, an alkoxy group having 1 to 10 carbon atoms (preferably 1 to 8 carbon atoms and more preferably 3 to 8 carbon atoms).

Examples of the alkoxy group include a methoxy group, an ethoxy group, an isopropoxy group, a t-butoxy group, a n-butoxy group, a n-hexyloxy group, a 2-ethylhexyloxy group, a 3,5,5-trimethylhexyloxy group, a n-propoxy group, an i-butoxy group, a sec-butoxy group, a pentyloxy group, and a cyclopentyloxy group.

The alkoxy group may be a substituted alkoxy group. Examples of the substituent for the alkoxy group include a halogen atom, a hydroxy group, an amino group, an alkoxy group, an amide group, and a carbonyl group.

In particular, the titanium compound may be a compound represented by general formula $M^1Y^1_4$ with $M^1$ representing a titanium atom and $Y^1$ representing a halogen atom, a hydroxy group, or an alkoxy group, where at least one (preferably two) of four $Y^1$ represents an alkoxy group having 1 to 10 (preferably 1 to 8) carbon atoms.

Specific examples of the titanium compound include titanium tetra-i-propoxide, titanium tetra-n-butoxide, titanium tetra-t-butoxide, titanium di-i-propoxide bis(ethylacetoacetate), titanium di-i-propoxide bis(acetylacetonate), titanium di-i-propoxide bis(triethanolaminate), titanium di-i-propoxide diacetate, titanium di-i-propoxide dipropionate, titanium di-n-butoxide bis(triethanolaminate), and titanium dihydroxide dilactate.

The content of the titania coating layer formed through a reaction of the titanium compound is preferably 10 mass % or about 10 mass % or more and 200 mass % or about 200 mass % or less, more preferably 20 mass % or about 20 mass % or more and 150 mass % or about 150 mass % or less, and further preferably 30 mass % or about 30 mass % or more and 100 mass % or about 100 mass % or less relative to the silica particle bodies in terms of titania from the viewpoint of good photocatalytic function.

When the content of the titania coating layer is 10 mass % or about 10 mass % or more, a sufficient amount of titania having a photocatalytic function may be provided, and the photocatalytic function may be easily exhibited in the visible range. When the content of the titania coating layer is 200 mass % or about 200 mass % or less, the incorporation of a Si—O—Ti bond that locally exhibits a photocatalytic function into the silica particle bodies (i.e., an excessive increase in the thickness of the titania coating layer, which makes it difficult to cause light to reach a Si—O—Ti bond on the surfaces of the silica particle bodies) is suppressed, and the photocatalytic function is easily exhibited on the surfaces or top layers of the silica particles.

The content of the titania coating layer is measured by the following method. Cellulose is added to 0.6 g of a sample and the mixture is molded into a disc. The disc is measured by qualitative/quantitative ultimate analysis using a scanning X-ray fluorescence spectrometer (ZSX Primus II manufactured by Rigaku Corporation) under conditions of X-ray output: 40 V-70 mA, measurement area: 10 mm (diameter), and measurement time: 15 minutes. The Kα intensity of the titania in this data is assumed to be the net intensity. The content of the titania coating layer is determined through conversion from a calibration curve for the standard content.

Silane Compound

In the silica particles according to this exemplary embodiment, the silica particle bodies each covered by the titania coating layer may be surface-treated with a silane compound having a hydrocarbon group. Even when the silica particles are surface-treated with a silane compound, the silica particles exhibit a photocatalytic function in the visible range. The dispersibility is also improved.

The silane compound has a hydrocarbon group. The hydrocarbon group of the silane compound is, for example, a saturated or unsaturated aliphatic hydrocarbon group having 1 to 20 carbon atoms (preferably 1 to 18 carbon atoms, more preferably 4 to 12 carbon atoms, and further preferably 4 to 10 carbon atoms) or an aromatic hydrocarbon group.

Examples of the silane compound include chlorosilane compounds, alkoxysilane compounds, and silazane compounds (e.g., hexamethyldisilazane).

Among them, the silane compound may be a compound represented by general formula $R^1{}_n SiR^2{}_m$ from the viewpoint of good photocatalytic function and improvement in dispersibility.

In the general formula $R^1{}_n SiR^2{}_m$, $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4. When n represents an integer of 2 or 3, multiple $R^1$ may represent the same group or different groups. When m represents an integer of 2 or 3, multiple $R^2$ may represent the same group or different groups.

The aliphatic hydrocarbon group represented by $R^1$ may be a linear, branched, or cyclic hydrocarbon group. From the viewpoint of dispersibility, a linear or branched hydrocarbon group is preferred and a linear hydrocarbon group is further preferred. The number of carbon atoms in the aliphatic hydrocarbon group is preferably 1 to 18, more preferably 4 to 12, and further preferably 4 to 10 from the viewpoint of good photocatalytic function and improvement in dispersibility. The aliphatic hydrocarbon group may be a saturated or unsaturated aliphatic hydrocarbon group, but a saturated aliphatic hydrocarbon group is preferred from the viewpoint of good photocatalytic function and improvement in dispersibility.

Examples of the saturated aliphatic hydrocarbon group include linear alkyl groups (e.g., methyl group, ethyl group, propyl group, butyl group, pentyl group, hexyl group, heptyl group, octyl group, nonyl group, decyl group, dodecyl group, hexadecyl group, and icosyl group), branched alkyl groups (e.g., isopropyl group, isobutyl group, isopentyl group, neopentyl group, 2-ethylhexyl group, tertiary butyl group, and tertiary pentyl group), and cyclic alkyl groups (e.g., cyclopropyl group, cyclopentyl group, cyclohexyl group, cycloheptyl group, cyclooctyl group, tricyclodecyl group, norbornyl group, and adamantyl group).

Examples of the unsaturated aliphatic hydrocarbon group include alkenyl groups (e.g., vinyl group (ethenyl group), 1-propenyl group, 2-propenyl group, 2-butenyl group, 1-butenyl group, 1-hexenyl group, 2-dodecenyl group, and pentenyl group) and alkynyl groups (e.g., ethynyl group, 1-propynyl group, 2-propynyl group, 1-butynyl group, 3-hexynyl group, and 2-dodecynyl group).

The aliphatic hydrocarbon group may be a substituted aliphatic hydrocarbon group. Examples of the substituent for the aliphatic hydrocarbon group include a glycidoxy group, a mercapto group, a methacryloyl group, and an acryloyl group.

The aromatic hydrocarbon group represented by $R^1$ is, for example, an aromatic hydrocarbon group having 6 to 27 carbon atoms (preferably 6 to 18 carbon atoms).

Examples of the aromatic hydrocarbon group include a phenylene group, a biphenylene group, a terphenylene group, a naphthalene group, and an anthracene group.

The aromatic hydrocarbon group may be a substituted aromatic hydrocarbon group. Examples of the substituent for the aromatic hydrocarbon group include a glycidoxy group, a mercapto group, a methacryloyl group, and an acryloyl group.

The halogen atom represented by $R^2$ is, for example, fluorine, chlorine, bromine, or iodine. Among them, the halogen atom is preferably chlorine, bromine, or iodine.

The alkoxy group represented by $R^2$ is, for example, an alkoxy group having 1 to 10 carbon atoms (preferably 1 to 8 carbon atoms and more preferably 3 to 8 carbon atoms).

Examples of the alkoxy group include a methoxy group, an ethoxy group, an isopropoxy group, a t-butoxy group, a n-butoxy group, a n-hexyloxy group, a 2-ethylhexyloxy group, a 3,5,5-trimethylhexyloxy group, and a n-undecyloxy group.

The alkoxy group may be a substituted alkoxy group. Examples of the substituent for the alkoxy group include a halogen atom, a hydroxy group, an amino group, an alkoxy group, an amide group, and a carbonyl group.

The compound represented by the general formula $R^1{}_n SiR^2{}_m$ is preferably a compound with $R^1$ representing a saturated hydrocarbon group from the viewpoint of good photocatalytic function and improvement in dispersibility. The compound represented by the general formula $R^1{}_n SiR^2{}_m$ is particularly preferably a compound with $R^1$ representing a saturated aliphatic hydrocarbon group having 1 to 20 carbon atoms, $R^2$ representing a halogen atom or an alkoxy group, n representing an integer of 1 to 3, and m representing an integer of 1 to 3 (n+m=4).

Specific examples of the compound represented by the general formula $R^1{}_n SiR^2{}_m$ include vinyltrimethoxysilane, propyltrimethoxysilane, i-butyltrimethoxysilane, n-butyltrimethoxysilane, n-hexyltrimethoxysilane, n-octyltrimethoxysilane, n-dodecyltriethoxysilane, phenyltrimethoxysilane, 3-glycidoxypropyltrimethoxysilane, tetramethoxysilane, methyltrimethoxysilane, dimethyldimethoxysilane, diphenyldimethoxysilane, o-methylphenyltrimethoxysilane, p-methylphenyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane.

The silane compounds may be used alone or in combination of two or more.

Characteristics of Silica Particles

The silica particles according to this exemplary embodiment have absorption at a wavelength of 400 nm or about 400 nm or more and 800 nm or about 800 nm or less in an ultraviolet-visible absorption spectrum.

Specifically, when the absorbance at a wavelength of 350 nm in an ultraviolet-visible absorption spectrum is assumed to be 1, the silica particles preferably have an absorbance of 0.02 or more (preferably 0.1 or more) at a wavelength of 450 nm and more preferably have an absorbance of 0.2 or more (preferably 0.3 or more) at a wavelength of 450 nm and an absorbance of 0.02 or more (preferably 0.1 or more) at a wavelength of 750 nm from the viewpoint of good photocatalytic function in the visible range.

The ultraviolet-visible absorption spectrum is measured by the following method. Silica particles are measured using a spectrophotometer (U-4100 manufactured by Hitachi High-Technologies Corporation) [measurement conditions, scanning speed: 600 nm, slit width: 2 nm, sampling interval: 1 nm] in a wavelength range of 200 nm or more and 900 nm or less to obtain an ultraviolet-visible absorption spectrum. This measurement may be performed on a thin-film sample obtained by molding particles.

The volume-average particle size of the silica particles is preferably 10 nm or about 10 nm or more and 1 μm or about 1 μm or less, more preferably 15 nm or about 15 nm or more and 500 nm or about 500 nm or less, and further preferably 20 nm or about 20 nm or more and 200 nm or about 200 nm or less.

When the volume-average particle size of the silica particles is 10 nm or about 10 nm or more, the silica particles are not easily aggregated, which may readily improve the photocatalytic function. When the volume-average average particle size of the silica particles is 1 μm or about 1 μm or less, the ratio of specific surface to volume increases, which may readily improve the photocatalytic function. Therefore, when the volume-average particle size of the silica particles is within the above range, a good photocatalytic function is easily exhibited in the visible range.

The volume-average particle size of the silica particles is measured using a Nanotrac UPA-ST (dynamic light scattering particle size analyzer manufactured by MicrotracBEL Corp.) under measurement conditions of sample concentration: 20% and measurement time: 300 seconds. This analyzer measures a particle size using Brownian movement of a dispersoid. The particle size is measured by applying laser beams to a solution and detecting the scattered light.

The particle size distribution measured by the dynamic light scattering particle size analyzer is divided into particle size sections (channels). Cumulative volume distribution of the particles is drawn from smaller particle sizes. The particle size at which the cumulative volume is 50% is defined as a volume-average particle size.

Method for Producing Silica Particles

The method for producing silica particles according to this exemplary embodiment includes forming a titania coating layer on each of surfaces of silica particle bodies through a reaction of a titanium compound having a structure in which a hydrocarbon group bonds to a titanium atom through an oxygen atom.

The silica particle bodies are heated at 180° C. or about 180° C. or higher and 500° C. or about 500° C. or lower while or after the titania coating layer is formed on each of the surfaces of the silica particle bodies.

In the method for producing silica particles according to this exemplary embodiment, silica particles (i.e., the silica particles according to this exemplary embodiment) that exhibit a photocatalytic function in the visible range are produced through the above process. The reason for this is believed to be as follows.

In the case where the silica particle bodies are heated at 180° C. or about 180° C. or higher and 500° C. or about 500° C. or lower while or after the titania coating layer is formed on each of the surfaces of the silica particle bodies, a hydrocarbon group in the reacted titanium compound is separated and brought onto the surfaces of the silica particle bodies to a certain degree. A part of the separated hydrocarbon group is carbonized, and the hydrocarbon group is incorporated as carbon into the surfaces of the silica particle bodies and the titania coating layer. As described above, the incorporated carbon functions as a charge separation substance and a promoter through absorption of visible light together with ultraviolet light.

In the method for producing silica particles according to this exemplary embodiment, therefore, the silica particles (i.e., the silica particles according to this exemplary embodiment) that exhibit a photocatalytic function in the visible range are believed to be produced.

Hereafter, the method for producing silica particles according to this exemplary embodiment will be described in detail.

First, the formation of a titania coating layer on each of the surfaces of the silica particle bodies will be described.

Non-limiting examples of the method for forming a titania coating layer on each of the surfaces of the silica particle bodies using the titanium compound include a method in which the titanium compound itself is directly brought into contact with the silica particle bodies and a method in which a treatment solution prepared by dissolving the titanium compound in a solvent is brought into contact with the silica particle bodies. Specific examples of the method include a method in which the titanium compound itself or the treatment solution is added under stirring to a dispersion liquid prepared by dispersing the silica particle bodies in a solvent and a method in which the titanium compound itself or the treatment solution is added (e.g., added dropwise or sprayed) to silica particle bodies being stirred with a Henschel mixer or the like.

By performing such a method, for example, the titania coating layer is formed on each of the surfaces of the silica particle bodies through a reaction of hydrocarbon groups (e.g., alkoxy groups) that bond to oxygen atoms in a titanium compound and a reaction of the hydrocarbon group with a silanol group on the surfaces of the silica particle bodies.

Examples of the solvent in which the titanium compound is dissolved include organic solvents (e.g., hydrocarbon solvent, ester solvent, ether solvent, halogen-based solvent, and alcohol solvent), water, and mixed solvents of the foregoing.

Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogen-based solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and i-propyl alcohol. Examples of the water include tap water, distilled water, and pure water.

Instead of the above solvents, a solvent such as dimethylformamide, dimethylacetamide, dimethyl sulfoxide, acetic acid, or sulfuric acid may also be used.

In the treatment solution prepared by dissolving the titanium compound in a solvent, the concentration of the titanium compound in the solvent is preferably 0.01 mol/L or more and 1 mol/L or less and more preferably 0.1 mol/L or more and 0.6 mol/L or less.

From the viewpoint of good photocatalytic function, the titania coating layer is formed using the titanium compound under the following conditions. The titania coating layer may be formed on each of the surfaces of the silica particle bodies using the titanium compound in an amount of 10 mass % or about 10 mass % or more and 200 mass % or about 200 mass % or less (preferably 20 mass % or more and 150 mass % or less and more preferably 30 mass % or more and 100 mass % or less) relative to the silica particle bodies.

When the amount of the titanium compound used is 10 mass % or about 10 mass % or more, a sufficient amount of titania having a photocatalytic function may be provided, and the photocatalytic function may be easily exhibited in the visible range. When the amount of the titanium compound used is 200 mass % or about 200 mass % or less, the incorporation of a Si—O—Ti bond that locally exhibits a photocatalytic function into the silica particle bodies (i.e., an excessive increase in the thickness of the titania coating layer, which makes it difficult to cause light to reach a Si—O—Ti bond on the surfaces of the silica particle bodies) is suppressed, and the photocatalytic function is easily exhibited on the surfaces or top layers of the silica particles.

The temperature at which the coating layer is formed using the titanium compound is preferably 5° C. or higher and 80° C. or lower and more preferably 15° C. or higher and 50° C. or lower. The time for the formation is preferably 5 minutes or longer and 120 minutes or shorter and more preferably 15 minutes or longer and 60 minutes or shorter.

After the titania coating layer is formed using the titanium compound, a drying treatment may be performed. The drying treatment may be performed by any well-known drying method such as a vacuum drying method or a spray drying method. The drying temperature may be 20° C. or higher and 150° C. or lower.

Next, the heat treatment at 180° C. or about 180° C. or higher and 500° C. or about 500° C. or lower (hereafter also referred to as a "particular heat treatment") will be described.

The particular heat treatment is performed while or after the titania coating layer is formed on each of the surfaces of the silica particle bodies. Specifically, the particular heat treatment is performed when the titania coating layer is formed on each of the surfaces of the silica particle bodies, when the drying treatment after the formation of the titania coating layer is performed, or after the drying treatment.

In the case where the particular heat treatment is performed when the titania coating layer is formed on each of the surfaces of the silica particle bodies, the heat treatment is performed at a formation temperature of 180° C. or about 180° C. or higher and 500° C. or about 500° C. or lower. In the case where the particular heat treatment is performed when the drying treatment after the formation of the titania coating layer is performed, the heat treatment is performed at a drying temperature of 180° C. or about 180° C. or higher and 500° C. or about 500° C. or lower.

The temperature in the particular heat treatment is 180° C. or about 180° C. or higher and 500° C. or about 500° C. or lower. From the viewpoint of good photocatalytic function, the temperature is preferably 200° C. or higher and 450° C. or lower and more preferably 250° C. or higher and 400° C. or lower.

The time for the particular heat treatment is preferably 10 minutes or longer and 300 minutes or shorter and more preferably 30 minutes or longer and 120 minutes or shorter from the viewpoint of good photocatalytic function.

The particular heat treatment may be performed by any well-known method that uses, for example, an electric furnace, a firing furnace (e.g., roller-hearth kiln and shuttle kiln), or a radiant heating furnace.

Next, the surface treatment of the silica particle bodies with a silane compound will be described.

The method for producing silica particles according to this exemplary embodiment may include surface-treating the silica particle bodies covered by the titania coating layer with a silane compound having a hydrocarbon group after the titania coating layer is formed on each of the surfaces of the silica particle bodies. This improves the dispersibility of the silica particles.

Non-limiting examples of the method for surface-treating the silica particle bodies with the silane compound include a method in which the silane compound itself is directly brought into contact with the silica particle bodies and a method in which a treatment solution prepared by dissolving the silane compound in a solvent is brought into contact with the silica particle bodies. Specific examples of the method include a method in which the silane compound itself or the treatment solution is added under stirring to a dispersion liquid prepared by dispersing the silica particle bodies in a solvent and a method in which the silane compound itself or the treatment solution is added (e.g., added dropwise or sprayed) to silica particle bodies being stirred with a Henschel mixer or the like.

By performing the above method, a reactive group (e.g., hydrolyzable group) in the silane compound reacts with a reactive group (a hydrolyzable group such as a hydroxy group, a halogen group, or an alkoxy group) left in the titania coating layer and a hydrolyzable group (e.g., a hydroxy group, a halogen group, or an alkoxy group) present on the surfaces of the silica particle bodies. Thus, the silica particle bodies are surface-treated with the silane compound.

Examples of the solvent in which the silane compound is dissolved include organic solvents (e.g., hydrocarbon solvent, ester solvent, ether solvent, halogen-based solvent, and alcohol solvent), water, and mixed solvents of the foregoing.

Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogen-based solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and i-propyl alcohol. Examples of the water include tap water, distilled water, and pure water.

Instead of the above solvents, a solvent such as dimethylformamide, dimethylacetamide, dimethyl sulfoxide, acetic acid, or sulfuric acid may also be used.

In the treatment solution prepared by dissolving the silane compound in a solvent, the concentration of the compound represented by $R^1{}_n SiR^2{}_m$ in the solvent is preferably 0.05 mol/L or more and 500 mol/L or less and more preferably 0.5 mol/L or more and 10 mol/L or less.

From the viewpoint of improvement in dispersibility, the silica particle bodies are surface-treated with the silane compound under the following conditions. The amount of the silane compound used for the surface treatment of the silica particle bodies may be 10 mass % or more and 100 mass % or less (preferably 20 mass % or more and 75 mass % or less and more preferably 25 mass % or more and 50 mass % or less) relative to the silica particle bodies covered by the titania coating layer. When the amount of the silane compound used for the surface treatment is 10 mass % or more, the dispersibility may be easily improved. When the amount of the silane compound used for the surface treatment is 100 mass % or less, an excessive increase in the amount of silicon (Si) relative to the titania coating layer (Ti—O—) of the silica particles may be suppressed, which tends to suppress the degradation of the photocatalytic function due to an excess amount of silicon (Si).

The temperature at which the silica particle bodies are surface-treated with the silane compound is preferably 15° C. or higher and 150° C. or lower and more preferably 20° C. or higher and 100° C. or lower. The surface treatment time is preferably 10 minutes or longer and 120 minutes or shorter and more preferably 30 minutes or longer and 90 minutes or shorter.

After the silica particle bodies are surface-treated with the silane compound, a drying treatment may be performed. The drying treatment may be performed by any well-known drying method such as a vacuum drying method or a spray drying method. The drying temperature may be 20° C. or higher and 150° C. or lower.

When the silica particle bodies covered by the titania coating layer are surface-treated with the silane compound having a hydrocarbon group, the silica particle bodies may be heat-treated at 180° C. or higher and 500° C. or lower while or after the silica particle bodies are surface-treated (i.e., the particular heat treatment may be performed). Specifically, the particular heat treatment is performed when the silica particle bodies are surface-treated with the silane compound, when the drying treatment after the surface treatment is performed, or after the drying treatment.

In the case where the particular heat treatment is performed when the silica particle bodies are surface-treated with the silane compound, the heat treatment is performed at a surface treatment temperature of 180° C. or higher and 500° C. or lower. In the case where the particular heat treatment is performed when the drying treatment after the surface treatment is performed, the heat treatment is performed at a drying temperature of 180° C. or higher and 500° C. or lower.

In the case where the surface treatment is performed with the silane compound, the particular heat treatment performed after the titania coating layer is formed on each of the surfaces of the silica particle bodies may be performed while or after the silica particle bodies are surface-treated.

By performing the particular heat treatment while or after the silica particle bodies are surface-treated, a hydrocarbon group in the reacted silane compound is separated and brought onto the surfaces of the silica particle bodies or the surface of the titania coating layer to a certain degree. A part of the separated hydrocarbon group is carbonized, and carbon obtained as a result of carbonization of the hydrocarbon is incorporated into the surfaces of the silica particle bodies and the titania coating layer. As described above, the incorporated carbon functions as a charge separation substance and a promoter through absorption of visible light together with ultraviolet light.

Thus, in the method for producing silica particles according to this exemplary embodiment, silica particles (i.e., the silica particles according to this exemplary embodiment) that exhibit a photocatalytic function in the visible range are easily produced. Furthermore, a certain amount of the hydrocarbon group in the reacted silane compound is left on the surfaces of the silica particle bodies or the surface of the titania coating layer by performing the particular heat treatment. This hydrocarbon group provides good dispersibility.

Through the above processes, the silica particles according to this exemplary embodiment are produced.

EXAMPLES

Hereafter, the present invention will be further specifically described based on Examples. Examples do not limit the present invention. Note that "part" and "%" are on a mass basis unless otherwise specified.

Example 1

Preparation of Silica Particle Bodies

Into a 3 L glass reaction vessel (diameter inside vessel: 16 cm) equipped with a stirrer, dropping nozzles, and a thermometer, 84.5 parts of methanol and 15.5 parts of 10% aqueous ammonia solution are inserted, and the temperature of the mixed solution (preliminary mixed solution) is adjusted to 25° C. The ammonia concentration is 0.744 mol/L. After the temperature of the preliminary mixed solution reaches 25° C., the dropping of tetramethoxysilane (TMOS) and a 6.0% aqueous ammonia solution is simultaneously started through the two dropping nozzles and is continued for 29 minutes to prepare a suspension of silica particle bodies (sol-gel silica particles). Herein, the dropping rate of TMOS is set to 1.32 parts/min in total relative to the preliminary mixed solution. The dropping rate of the 6.0% aqueous ammonia solution is set to 0.50 parts/min in total relative to the preliminary mixed solution. The volume-average particle size of the silica particle bodies is 140 nm. Subsequently, 50 parts of trimethylsilane is added to the silica particle bodies. The mixture is heated to 60° C. under stirring and then a reaction is caused to proceed while being heated for four hours to prepare hydrophobic silica particle bodies (sol-gel silica particles).

Production of Silica Particles (Formation of Titania Coating Layer)

Tetrabutyl orthotitanate (titanium tetra-n-butoxide) is diluted with butanol so as to have a concentration of 20.0 mass % to prepare an alcohol diluted solution. The temperature of the prepared solution of the silica particle bodies is adjusted to 20° C. The alcohol diluted solution is added to the solution of the silica particle bodies, and a reaction is caused on the surfaces of the silica particle bodies to form a titania coating layer. Thus, silica particles are produced. The alcohol diluted solution is added so that the content of the tetrabutyl orthotitanate serving as a titanium compound is 80 parts relative to 100 parts of the silica particle bodies.

Subsequently, the resulting suspension of silica particles is spray-dried at an outlet temperature of 80° C. using a spray dryer (B-290) manufactured by BUCHI to produce silica particles. The dried silica particles are heated to 400° C. and then kept at 400° C. for 1 hour using a programmed tubular electric furnace TMF-300N to obtain silica particles 1.

Example 2

Silica particles 2 are obtained in the same manner as in Example 1, except that the amount of tetrabutyl orthotitanate added is changed to 10 parts in the production of silica particles (formation of titania coating layer) in Example 1.

Example 3

Silica particles 3 are obtained in the same manner as in Example 1, except that the amount of tetrabutyl orthotitanate added is changed to 200 parts in the production of silica particles (formation of titania coating layer) in Example 1.

Example 4

Silica particles 4 are obtained in the same manner as in Example 1, except that the amount of tetrabutyl orthotitanate added is changed to 7 parts in the production of silica particles (formation of titania coating layer) in Example 1.

Example 5

Silica particles 5 are obtained in the same manner as in Example 1, except that the amount of tetrabutyl orthotitanate added is changed to 215 parts in the production of silica particles (formation of titania coating layer) in Example 1.

Example 6

Silica particles 6 are obtained in the same manner as in Example 1, except that the temperature of the electric furnace in the heat treatment is changed from 400° C. to 180° C. in the production of silica particles (formation of titania coating layer) in Example 1.

Example 7

Silica particles 7 are obtained in the same manner as in Example 1, except that the temperature of the electric furnace in the heat treatment is changed from 400° C. to 500° C. in the production of silica particles (formation of titania coating layer) in Example 1.

Example 8

The silica particles 1 obtained in Example 1 are further dispersed in methanol. Then, 35 mass % of decyltrimethoxysilane relative to the silica particle bodies of the silica particles is added dropwise thereto. A reaction is caused to proceed at 40° C. for 1 hour to perform a surface treatment with a silane compound. The surface-treated silica particles are spray-dried at an outlet temperature of 120° C. The dried silica particles are further heated in an electric furnace at 350° C. for 1 hour to obtain silica particles 8.

Example 9

The silica particles 1 obtained in Example 1 are further dispersed in methanol. Then, 35 mass % of hexamethyldisilazane relative to the silica particle bodies of the silica particles is added dropwise thereto. A reaction is caused to proceed at 40° C. for 1 hour to perform a surface treatment with a silane compound. The surface-treated silica particles are spray-dried at an outlet temperature of 120° C. The dried silica particles are further heated in an electric furnace at 350° C. for 1 hour to obtain silica particles 9.

Example 10

Silica particles 10 are obtained in the same manner as in Example 1, except that the temperature of the preliminary mixed solution before the addition of TMOS is changed from 25° C. to 55° C. and the volume-average particle size of the silica particle bodies is changed to 10 nm in the preparation of silica particle bodies in Example 1.

Example 11

Silica particles 11 are obtained in the same manner as in Example 1, except that the temperature of the preliminary mixed solution before the addition of TMOS is changed from 25° C. to 8° C. and the volume-average particle size of the silica particle bodies is changed to 860 nm in the preparation of silica particle bodies in Example 1.

Example 12

Silica particles 12 are obtained in the same manner as in Example 1, except that the temperature of the preliminary mixed solution before the addition of TMOS is changed from 25° C. to 65° C. and the volume-average particle size of the silica particle bodies is changed to 6 nm in the preparation of silica particle bodies in Example 1.

Example 13

Silica particles 13 are obtained in the same manner as in Example 1, except that the temperature of the preliminary mixed solution before the addition of TMOS is changed from 25° C. to 5° C. and the volume-average particle size of the silica particle bodies is changed to 1000 nm in the preparation of silica particle bodies in Example 1.

Example 14

Silica particles 14 are obtained in the same manner as in Example 1, except that the tetrabutyl orthotitanate (titanium tetra-n-butoxide) is changed to titanium di-i-propoxide bis (acetylacetonate) in the production of silica particles (formation of titania coating layer) in Example 1.

Example 15

The silica particles 1 obtained in Example 1 are further dispersed in methanol. Then, 35 mass % of hexyltrimethoxysilane relative to the silica particle bodies of the silica particles is added dropwise thereto. A reaction is caused to proceed at 40° C. for 1 hour to perform a surface treatment with a silane compound. The surface-treated silica particles are spray-dried at an outlet temperature of 120° C. The dried silica particles are further heated in an electric furnace at 350° C. for 1 hour to obtain silica particles 15.

Example 16

The silica particles 1 obtained in Example 1 are further dispersed in methanol. Then, 35 mass % of isobutyltrimethoxysilane relative to the silica particle bodies of the silica particles is added dropwise thereto. A reaction is caused to proceed at 40° C. for 1 hour to perform a surface treatment with a silane compound. The surface-treated silica particles are spray-dried at an outlet temperature of 120° C. The dried silica particles are further heated in an electric furnace at 350° C. for 1 hour to obtain silica particles 16.

Comparative Example 1

Commercially available anatase titanium oxide particles ("SSP-20 (manufactured by SAKAI CHEMICAL INDUSTRY Co., Ltd.)", volume-average particle size: 12 nm) themselves are used as titanium oxide particles C1.

Comparative Example 2

Commercially available anatase titanium oxide particles ("SSP-20 (manufactured by SAKAI CHEMICAL INDUSTRY Co., Ltd.)", volume-average particle size: 12 nm) are heated in an electric furnace at 400° C. for 1 hour to obtain titanium oxide particles C2.

Comparative Example 3

Titanium oxide particles (volume-average particle size: 140 nm) produced by a sol-gel method are heated in an electric furnace at 265° C. for 1 hour to obtain titanium oxide particles C3.

Comparative Example 4

Commercially available visible-light-responding photocatalyst dispersion liquid ("RENECAT (manufactured by TOSHIBA CORPORATION)", dispersion liquid containing tungsten oxide particles dispersed therein, volume-average particle size: 200 nm) are dried at ordinary temperature (25° C.) to obtain tungsten oxide particles C4.

Comparative Example 5

Silica particles C5 are obtained in the same manner as in Example 1, except that the temperature of the electric furnace in the heat treatment is changed from 400° C. to 650° C. in the production of silica particles (formation of titania coating layer) in Example 1.

Comparative Example 6

Silica particles C6 are obtained in the same manner as in Example 1, except that the temperature of the electric furnace in the heat treatment is changed from 400° C. to 120° C. in the production of silica particles (formation of titania coating layer) in Example 1.

Measurement

For the particles obtained in each of Examples and Comparative Examples, the ultraviolet-visible absorption spectrum characteristics (given as "UV-Visi characteristics" in Tables, absorbances at wavelengths of 450 nm and 750 nm obtained when the absorbance at a wavelength of 350 nm is assumed to be 1) are measured by the above-described method.

Evaluation

Degradability

Degradability is evaluated as photocatalytic characteristics in the visible range. The degradability is evaluated on the basis of the degradability (transmittance change) of methylene blue. Specifically, 30 mL of a diluted methylene blue solution prepared so as to have a methylene blue concentration of 20 ppm (mass basis) and 0.01 g of the particles obtained in each of Examples and Comparative Examples are inserted into a beaker to prepare two samples.

With a light-emitting diode (LED) that emits visible light with a wavelength of 400 nm or more and 550 nm or less, which is outside the absorption wavelength range (550 nm or more and 800 nm or less) of methylene blue, the visible light is continuously applied to one sample just after the preparation for 7 hours. The other sample just after the preparation is stored in a dark place for 7 hours.

The transmittances (concentration changes of methylene blue) at a wavelength of 650 nm of the sample just after the preparation, the sample to which the visible light has been continuously applied for 7 hours, and the sample after the storage in a dark place are measured using a spectrophotometer "SP-300 (OPTIMA INC.)". $\Delta T1$ and $\Delta T2$ are determined from the following formulae.

$\Delta T1$=(transmittance of sample to which visible light has been continuously applied for 7 hours)−(transmittance of sample just after preparation)

$\Delta T2$=(transmittance of sample after storage in dark place)−(transmittance of sample just after preparation)

The degradability is evaluated on the basis of transmittance change $\Delta T = \Delta T1 - \Delta T2$. The evaluation criteria are as follows.

Evaluation Criteria of Degradability
A: $15\% \leq \Delta T$
B: $5\% \leq \Delta T < 15\%$
C: $\Delta T < 5\%$ Dispersibility The dispersibility is evaluated as follows. Into a beaker, 0.05 g of the particles obtained in each of Examples and Comparative Examples are inserted, and 1 g of methanol is added thereto to sufficiently wet the particles. Subsequently, 40 g of pure water is added thereto and then dispersion is performed with an ultrasonic disperser for 10 minutes. The particle size distribution of the resulting product is then measured with a Nanotrac UPA-ST (dynamic light scattering particle size analyzer manufactured by MicrotracBEL Corp.). The dispersibility is evaluated on the basis of the volumetric particle size distribution profile. The evaluation criteria are as follows.

Evaluation Criteria of Dispersibility
A: The volumetric particle size distribution has only one peak and the dispersibility is good.
B: The volumetric particle size distribution has two peaks, but the peak value of the principal peak is ten or more times larger than that of the other peak, which practically poses no problem in terms of dispersibility.
C: The volumetric particle size distribution has three or more peaks and the dispersibility is poor.

Tables 1 and 2 collectively show the details and evaluation results of Examples and Comparative Examples.

In Tables 1 and 2, the "Particle size D50v" indicates the volume-average particle size of the particles (particles before formation of a titania coating layer, titanium oxide particles, and tungsten oxide particles) used.

TABLE 1

| | Conditions for forming titania coating layer using titanium compound | | | | Conditions for surface treatment with silane compound | |
| --- | --- | --- | --- | --- | --- | --- |
| | Particle to be treated (particle body) | Type of titanium compound | Content of titania coating layer (mass %) | Heat treatment temperature (° C.) | Type of silane compound | Heat treatment temperature (° C.) |
| Example 1 | Silica particle | titanium tetra-n-butoxide | 80 | 400 | — | — |
| Example 2 | Silica particle | titanium tetra-n-butoxide | 10 | 400 | — | — |
| Example 3 | Silica particle | titanium tetra-n-butoxide | 200 | 400 | — | — |

TABLE 1-continued

| | Particle to be treated | Type of titanium compound | Content of titania coating layer (mass %) | Heat treatment temperature (°C) | Type of silane compound | Heat treatment temperature (°C) |
|---|---|---|---|---|---|---|
| Example 4 | Silica particle | titanium tetra-n-butoxide | 7 | 400 | — | — |
| Example 5 | Silica particle | titanium tetra-n-butoxide | 215 | 400 | — | — |
| Example 6 | Silica particle | titanium tetra-n-butoxide | 80 | 180 | — | — |
| Example 7 | Silica particle | titanium tetra-n-butoxide | 80 | 500 | — | — |
| Example 8 | Silica particle | titanium tetra-n-butoxide | 80 | 400 | decyltrimethoxysilane | 350 |
| Example 9 | Silica particle | titanium tetra-n-butoxide | 80 | 400 | hexamethyldisilazane | 350 |
| Example 10 | Silica particle | titanium tetra-n-butoxide | 80 | 400 | — | — |
| Example 11 | Silica particle | titanium tetra-n-butoxide | 80 | 400 | — | — |
| Example 12 | Silica particle | titanium tetra-n-butoxide | 80 | 400 | — | — |
| Example 13 | Silica particle | titanium tetra-n-butoxide | 80 | 400 | — | — |
| Example 14 | Silica particle | titanium di-i-propoxide bis(acetylacetonate) | 80 | 400 | — | — |
| Example 15 | Silica particle | titanium tetra-n-butoxide | 80 | 400 | hexyltrimethoxysilane | 350 |
| Example 16 | Silica particle | titanium tetra-n-butoxide | 80 | 400 | isobutyltrimethoxysilane | 350 |

| | Characteristics | | | | |
|---|---|---|---|---|---|
| | UV-Visi characteristics | | | Evaluation | |
| | Particle size D50v (nm) | Absorbance at 450 nm | Absorbance at 750 nm | Degradability | Dispersibility |
| Example 1 | 156 | 0.56 | 0.25 | A | B |
| Example 2 | 142 | 0.36 | 0.22 | A | B |
| Example 3 | 175 | 0.58 | 0.27 | A | B |
| Example 4 | 141 | 0.28 | 0.18 | B | B |
| Example 5 | 178 | 0.32 | 0.12 | B | B |
| Example 6 | 156 | 0.22 | 0.10 | B | B |
| Example 7 | 156 | 0.36 | 0.19 | B | B |
| Example 8 | 158 | 0.53 | 0.27 | A | A |
| Example 9 | 158 | 0.39 | 0.24 | B | B |
| Example 10 | 11 | 0.49 | 0.26 | A | B |
| Example 11 | 960 | 0.51 | 0.27 | A | B |
| Example 12 | 7 | 0.37 | 0.20 | B | B |
| Example 13 | 1116 | 0.36 | 0.22 | B | B |
| Example 14 | 156 | 0.35 | 0.18 | B | B |
| Example 15 | 158 | 0.55 | 0.26 | A | A |
| Example 16 | 158 | 0.53 | 0.25 | A | A |

TABLE 2

| | Conditions for forming titania coating layer using titanium compound | | | Conditions for surface treatment with silane compound | |
|---|---|---|---|---|---|
| | Particle to be treated (particle body) | Type of titanium compound | Content of titania coating layer (mass %) | Heat treatment temperature (°C) | Type of silane compound | Heat treatment temperature (°C) |
| Comparative Example 1 | Anatase titanium oxide particle | — | — | — | — | — |
| Comparative Example 2 | Anatase titanium oxide particle | — | — | 400 | — | — |
| Comparative Example 3 | Titanium oxide particle (sol-gel method) | — | — | 255 | — | — |

TABLE 2-continued

| | | | | | | |
|---|---|---|---|---|---|---|
| Comparative Example 4 | Tungsten oxide particle | — | — | — | — | — |
| Comparative Example 5 | Silica particle | titanium tetra-n-butoxide | 80 | 650 | — | — |
| Comparative Example 6 | Silica particle | titanium tetra-n-butoxide | 80 | 120 | — | — |

| | Characteristics | | | | |
|---|---|---|---|---|---|
| | | UV-Visi characteristics | | Evaluation | |
| | Particle size D50v (nm) | Absorbance at 450 nm | Absorbance at 750 nm | Degradability | Dispersibility |
| Comparative Example 1 | 12 | — | — | C | C |
| Comparative Example 2 | 12 | — | — | C | C |
| Comparative Example 3 | 140 | — | — | C | C |
| Comparative Example 4 | 200 | — | — | B | C |
| Comparative Example 5 | 156 | — | — | C | B |
| Comparative Example 6 | 157 | — | — | C | B |

As is clear from the above results, the degradability is better in Examples than in Comparative Examples. This indicates that the photocatalytic function in the visible range is better in Examples than in Comparative Examples. In Examples, good dispersibility is also achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A silica particle comprising:
a silica particle body; and
a titania coating layer formed on a surface of the silica particle body, wherein
the silica particle has an absorbance of 0.02 or more at a wavelength of about 450 nm and at about 750 nm in an ultraviolet-visible absorption spectrum when the absorbance at a wavelength of 350 nm is assumed to be 1,
the titania coating layer comprising a hydrocarbon group bonded to a titanium atom through an oxygen atom, and carbon is incorporated into surfaces of the silica particle body and the titania coating layer.

2. The silica particle according to claim 1,
wherein the hydrocarbon group derives from a titanium compound represented by general formula $M^1Y^1_4$,
where $M^1$ represents a titanium atom; $Y^1$ represents a halogen atom, a hydroxy group, or an alkoxy group; and four $Y^1$ may represent the same group or different groups, where at least one of four $Y^1$ represents an alkoxy group.

3. The silica particle according to claim 1, wherein a content of the titania coating layer is about 10 mass % or more and about 200 mass % or less relative to the silica particle body in terms of titania.

4. The silica particle according to claim 1, wherein the silica particle body covered by the titania coating layer is surface-treated with a silane compound having a hydrocarbon group.

5. The silica particle according to claim 4,
wherein the silane compound is a compound represented by general formula $R^1_n SiR^2_m$,
where $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4; when n represents an integer of 2 or 3, a plurality of $R^1$ may represent the same group or different groups; and when m represents an integer of 2 or 3, a plurality of $R^2$ may represent the same group or different groups.

6. The silica particle according to claim 5, wherein $R^1$ represents a linear saturated aliphatic hydrocarbon group.

7. The silica particle according to claim 5, wherein $R^1$ in the general formula $R^1_n SiR^2_m$ represents an aromatic hydrocarbon group having 6 to 27 carbon atoms.

8. The silica particle according to claim 7, wherein the aromatic hydrocarbon group is at least one selected from the group consisting of a phenylene group, a biphenylene group, a terphenylene group, a naphthalene group, and an anthracene group.

9. The silica particle according to claim 5, wherein the halogen atom is at least one selected from the group consisting of chlorine, bromine, and iodine.

10. The silica particle according to claim 5, wherein the alkoxy group has 1 to 10 carbon atoms.

11. The silica particle according to claim 1, wherein the silica particle has a volume-average particle size of about 10 nm or more and about 1 μm or less.

12. The silica particle according to claim 1, wherein the silica particle has an absorbance of 0.02 or more at a wavelength of about 400 nm or more and about 800 nm or less in an ultraviolet-visible absorption spectrum when the absorbance at a wavelength of 350 nm is assumed to be 1.

13. A method for producing a silica particle, comprising:
forming a titania coating layer on a surface of a silica particle body through a reaction of a titanium compound having a structure in which a hydrocarbon group bonds to a titanium atom through an oxygen atom,
wherein the silica particle body is dried and heated at a temperature of about 180° C. or higher and about 500° C. or lower while or after the titania coating layer is formed on the surface of the silica particle body,
wherein the silica particle has an absorbance of 0.02 or more at a wavelength of about 450 nm and at about 750 nm in an ultraviolet-visible absorption spectrum when the absorbance at a wavelength of 350 nm is assumed to be 1, and
wherein carbon is incorporated into surfaces of the silica particle body and the titania coating layer.

14. The method according to claim 13,
wherein the titanium compound is a compound represented by general formula $M^1Y^1_4$,
where $M^1$ represents a titanium atom; $Y^1$ represents a halogen atom, a hydroxy group, or an alkoxy group; and four $Y^1$ may represent the same group or different groups, where at least one of four $Y^1$ represents an alkoxy group.

15. The method according to claim 13, comprising surface-treating the silica particle body covered by the titania coating layer with a silane compound having a hydrocarbon group after the titania coating layer is formed on the surface of the silica particle body.

16. The method according to claim 15,
wherein the silane compound is a compound represented by general formula $R^1_n SiR^2_m$,
where $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4; when n represents an integer of 2 or 3, a plurality of $R^1$ may represent the same group or different groups; and when m represents an integer of 2 or 3, a plurality of $R^2$ may represent the same group or different groups.

17. The method according to claim 16, wherein the halogen atom is at least one selected from the group consisting of chlorine, bromine, and iodine.

18. The method according to claim 16, wherein the alkoxy group has 1 to 10 carbon atoms.

19. The method according to claim 13, wherein the silica particle body is heated at the temperature of about 180° C. or higher and about 500° C. or lower after being dried at 20° C. or higher and 150° C. or lower.

* * * * *